US010901957B2

(12) United States Patent
Natarajan et al.

(10) Patent No.: US 10,901,957 B2
(45) Date of Patent: Jan. 26, 2021

(54) CHECKPOINTING FOR INCREASING EFFICIENCY OF A BLOCKCHAIN

(71) Applicant: International Business Machines Corporation, Armonk, NY (US)

(72) Inventors: Senthilnathan Natarajan, Bangalore (IN); Chander Govindarajan, Bangalore (IN); Manish Sethi, Cary, NC (US); Adarsh Saraf, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/116,191

(22) Filed: Aug. 29, 2018

(65) Prior Publication Data

US 2020/0073962 A1   Mar. 5, 2020

(51) Int. Cl.
| | | |
|---|---|---|
| G06F 16/182 | (2019.01) | |
| G06F 16/27 | (2019.01) | |
| H04L 9/06 | (2006.01) | |
| H04L 29/14 | (2006.01) | |
| G06F 16/18 | (2019.01) | |

(52) U.S. Cl.
CPC ...... *G06F 16/1834* (2019.01); *G06F 16/1805* (2019.01); *G06F 16/27* (2019.01); *H04L 9/0643* (2013.01); *H04L 69/40* (2013.01); *H04L 2209/38* (2013.01)

(58) Field of Classification Search
CPC .. G06F 16/1834; G06F 16/1805; G06F 16/27; H04L 9/0643; H04L 2209/38; H04L 63/00; H04L 9/3239

USPC .......................................................... 707/827
See application file for complete search history.

(56) References Cited

U.S. PATENT DOCUMENTS

| | | | |
|---|---|---|---|
| 5,764,877 A * | 6/1998 | Lomet ................. | G06F 11/1451 714/6.32 |
| 7,072,818 B1 * | 7/2006 | Beardslee ........ | G01R 31/31705 703/14 |
| 8,364,648 B1 * | 1/2013 | Sim-Tang ........... | G06F 16/2358 707/674 |
| 9,639,429 B2 * | 5/2017 | Stewart ............... | G06F 11/1471 |
| 10,102,265 B1 * | 10/2018 | Madisetti ........... | G06Q 20/0658 |

(Continued)

OTHER PUBLICATIONS

Dilli et al., "A Low Disk-Bound Transaction Logging System for In-Memory Distributed Data Stores", 2016 IEEE International Conference on Cluster Computing, Sep. 12-16, 2016, pp. 11-20. (Year: 2016).*

(Continued)

*Primary Examiner* — Phuong Thao Cao

(57) ABSTRACT

An example operation may include one or more of retrieving, into a corrupted node in a blockchain network that is at least one corrupted or forked, a state database checkpoint of a state database created at a block number of a blockchain of the blockchain network, wherein the retrieved state database checkpoint comprises a last known non-corrupted or non-forked checkpoint state, retrieving, into the corrupted node, blocks of the blockchain from the checkpoint block number to a current block number, constructing an initial state database from the retrieved state database checkpoint, and executing, at the corrupted node, the transactions of the retrieved blocks on the initial state database to generate a current state database.

18 Claims, 20 Drawing Sheets

(56) References Cited

U.S. PATENT DOCUMENTS

| | | | | |
|---|---|---|---|---|
| 10,521,775 | B2* | 12/2019 | Hearn | H04L 9/3297 |
| 10,608,824 | B1* | 3/2020 | Praus | H04L 9/3033 |
| 2007/0174695 | A1* | 7/2007 | Varadarajan | G06F 11/1438 714/15 |
| 2010/0114832 | A1* | 5/2010 | Lillibridge | G06F 16/128 707/649 |
| 2010/0185719 | A1* | 7/2010 | Howard | G06F 9/5044 709/201 |
| 2010/0228999 | A1* | 9/2010 | Maheshwari | G06F 21/6218 713/189 |
| 2012/0110150 | A1* | 5/2012 | Kosuru | H04L 41/0863 709/221 |
| 2012/0136901 | A1* | 5/2012 | Raatikka | G06F 16/2358 707/797 |
| 2014/0172803 | A1* | 6/2014 | Diaconu | G06F 16/128 707/649 |
| 2014/0215481 | A1* | 7/2014 | Piet | G06F 11/008 718/104 |
| 2015/0212897 | A1* | 7/2015 | Kottomtharayil | G06F 11/00 714/20 |
| 2015/0244795 | A1* | 8/2015 | Cantwell | H04L 67/1095 709/202 |
| 2015/0301824 | A1* | 10/2015 | Patton | G06F 8/71 717/122 |
| 2015/0339366 | A1* | 11/2015 | Laiho | G06F 16/27 707/610 |
| 2015/0356207 | A1* | 12/2015 | Reitman | G06F 30/15 703/1 |
| 2016/0110261 | A1* | 4/2016 | Parab | G06F 11/14 707/692 |
| 2016/0125018 | A1* | 5/2016 | Tomoda | G06F 16/2455 707/703 |
| 2016/0321145 | A1* | 11/2016 | Fang | G06F 11/1471 |
| 2016/0373292 | A1* | 12/2016 | Sigoure | H04L 41/0856 |
| 2017/0003176 | A1 | 1/2017 | Le et al. | |
| 2017/0031676 | A1 | 2/2017 | Cecchetti et al. | |
| 2017/0060473 | A1* | 3/2017 | Fitzhardinge | G06F 16/9024 |
| 2017/0236123 | A1* | 8/2017 | Ali | G06Q 20/3825 705/75 |
| 2017/0289111 | A1 | 10/2017 | Voell et al. | |
| 2017/0322997 | A1* | 11/2017 | Levy | G06F 12/128 |
| 2017/0345011 | A1* | 11/2017 | Salami | G06Q 20/10 |
| 2017/0364552 | A1* | 12/2017 | Pattanaik | H04L 9/3297 |
| 2018/0032555 | A1* | 2/2018 | Harrison | G06F 16/289 |
| 2018/0063709 | A1 | 3/2018 | Morrison | |
| 2018/0150799 | A1* | 5/2018 | Hunt | H04L 9/3297 |
| 2018/0150835 | A1* | 5/2018 | Hunt | H04L 67/10 |
| 2018/0152289 | A1* | 5/2018 | Hunt | G06Q 20/223 |
| 2018/0204213 | A1* | 7/2018 | Zappier | H04L 9/0819 |
| 2018/0232412 | A1* | 8/2018 | Bensberg | G06F 11/1464 |
| 2018/0300382 | A1* | 10/2018 | Madisetti | G06F 16/27 |
| 2018/0331832 | A1* | 11/2018 | Pulsifer | H04L 9/0637 |
| 2018/0341930 | A1* | 11/2018 | Moir | G06Q 20/3825 |
| 2019/0043050 | A1* | 2/2019 | Smith | H04L 9/0637 |
| 2019/0097790 | A1* | 3/2019 | Li | H04L 9/085 |
| 2019/0102409 | A1* | 4/2019 | Shi | H04L 63/08 |
| 2019/0165930 | A1* | 5/2019 | Castinado | H04L 63/123 |
| 2019/0199787 | A1* | 6/2019 | Carver | H04L 67/2842 |
| 2019/0303621 | A1* | 10/2019 | Baset | H04L 63/123 |
| 2019/0324866 | A1* | 10/2019 | Bensberg | G06F 16/1734 |
| 2019/0370148 | A1* | 12/2019 | Du | G06F 11/366 |
| 2019/0370247 | A1* | 12/2019 | Eluri | G06F 3/0619 |
| 2019/0386817 | A1* | 12/2019 | Carson | H04L 9/0637 |
| 2019/0391884 | A1* | 12/2019 | Gottapu | G06F 11/1464 |
| 2019/0392118 | A1* | 12/2019 | Elden | H04L 63/00 |
| 2019/0394023 | A1* | 12/2019 | Menon | H04L 9/3228 |
| 2020/0004648 | A1* | 1/2020 | Xu | G06F 9/4856 |
| 2020/0012527 | A1* | 1/2020 | Hartsock | G06F 9/45558 |
| 2020/0026603 | A1* | 1/2020 | Harwood | G06F 11/2048 |
| 2020/0067697 | A1* | 2/2020 | Puddu | H04L 9/0637 |
| 2020/0151714 | A1* | 5/2020 | Chan | G06Q 20/389 |

OTHER PUBLICATIONS

Li et al., "Securing Proof-of-Stake Blockchain Protocols", Data Privacy Management, Cryptocurrencies and Blockchain Technology, published 2017, 19 pages. (Year: 2017).*

List of IBM Patents or Patent Applications Treated as Related, todays date.

S. Natarajan et al., "Checkpointing for Increasing Efficiency of a Blockchain", U.S. Appl. No. 16/116,239, filed Aug. 29, 2018.

S. Natarajan et al., "Checkpointing for Increasing Efficiency of a Blockchain", U.S. Appl. No. 16/115,988, filed Aug. 29, 2018.

* cited by examiner

510

520

530

CHECKPOINTING FOR INCREASING EFFICIENCY OF A BLOCKCHAIN

TECHNICAL FIELD

This application generally relates to a database storage system, and more particularly, to checkpointing for increasing efficiency of a blockchain.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Blockchains provide many advantages over a conventional centralized database. In a blockchain network, transaction data is provided to a distributed network of peer nodes. Each peer node stores a copy of the database or ledger as a set of key/value pairs. Users of the network provide transaction data for new transactions to one or more of the peers. Entities within the network, which may be peer nodes, verify the transaction. At an appropriate juncture depending on the operational configuration of a blockchain network, a peer will form a set of verified pending transactions into a data block. The data block includes data, such as a cryptographic hash, linking the block to a previous data block, thereby forming a chain of data blocks, referred to as a blockchain. The newly formed data block is communicated to other peers of the network who update their version of the blockchain and state of the database.

Advantages of a blockchain include the removal of a central trusted authority. Immutability of the ledger is also achieved via the cryptographic hash links from one data block to the next. However, blockchain networks are not without their drawbacks.

When a new node wishes to join the network, there can be a long duration required to bootstrap the new node. Typically, a new node has to validate and commit each transaction from block 1 to the current block. If there are millions of committed transactions, the time taken for a new peer to sync the state of the database could be hours/days.

A further disadvantage can be that significant consumption of storage capacity may be required for peer nodes in long running blockchain networks. When a blockchain platform committed a lot of transactions, the storage capacity would increase significantly due to both Block Storage including multiple certificates & signatures, read/write set, etc. and storage of the State Database including the key/value pairs in the write set and associated indexing structure. Hard disk drive storage is (HDD) is cheaper but block storage and state database on a solid state drive (SSD) would improve the blockchain performance significantly as they are being used in a critical performance path. Until a block is written and flushed to the disk, peer does not update the state database. Until valid write sets are written to the state database, peer cannot process the next block and transactions cannot be simulated.

A further problem is a lack of confirmation on State Convergence after validation and commit of a block to the blockchain. A peer can go out of sync with other peers in the blockchain network due to corrupt disk or some unknown reasons. As there is no verification on the state changes after committing a block, there is no early way to identify state divergence.

There may be a problem with longer duration to recovery from a disk corruption or fork in the blockchain/State database. Similar to bootstrapping a new node, when there is a disk corruption or a fork in the blockchain, it is required to reconstruct the state by executing all transactions since block 1 to the current block which may take hours to days on a long running blockchain network.

What is required is an improved method for operating a blockchain.

SUMMARY

One example embodiment provides a system that includes a blockchain network comprising a plurality of peer nodes. One or more of the peer nodes comprise a processor and memory and are programmed to store a blockchain and a state database comprising a plurality of key/value pairs, wherein one or more of the plurality of peer nodes are programmed to perform one or more of generate a state database checkpoint, obtain consensus on the state database checkpoint, and store the state database checkpoint.

One example embodiment provides a system that includes a blockchain network comprising a plurality of peer nodes. One or more of the peer nodes comprise a processor and memory and are programmed to store a blockchain and a state database comprising a plurality of key/value pairs, wherein one or more of the plurality of peer nodes are programmed to perform one or more of determine that the node is a corrupted node that is at least one of corrupted or forked, retrieve a state database checkpoint of a state database created at a block number of the blockchain, retrieve blocks of the blockchain from the checkpoint block number to a current block number, construct an initial state database from the received state database checkpoint, and execute the transactions of the retrieved blocks on the initial state database to generate a current state database.

One example embodiment provides a system that includes a blockchain network comprising a plurality of peer nodes.

One or more of the peer nodes comprise a processor and memory and are programmed to store a blockchain and a state database comprising a plurality of key/value pairs, wherein one or more of the plurality of peer nodes are programmed to perform one or more of retrieve a state database checkpoint of a state database created at a block number of the blockchain, retrieve blocks of the blockchain from the checkpoint block number to a current block number, construct an initial state database from the received state database checkpoint, and execute the transactions of the retrieved blocks on the initial state database to generate a current state database.

Another example embodiment provides a method that includes one or more of in one or more peer nodes of a plurality of peer nodes of a blockchain network that stores a blockchain and a state database, periodically generating a state database checkpoint, obtaining a consensus on the state database checkpoint from one or more of the one or more peer nodes, and storing the consensus state database checkpoint.

Another example embodiment provides a method that includes one or more of retrieving, into a corrupted node in a blockchain network that is at least one corrupted or forked, a state database checkpoint of a state database created at a block number of a blockchain of the blockchain network, wherein the retrieved state database checkpoint comprises a last known non-corrupted or non-forked checkpoint state, retrieving, into the corrupted node, blocks of the blockchain from the checkpoint block number to a current block number, constructing an initial state database from the retrieved state database checkpoint, and executing, at the corrupted node, the transactions of the retrieved blocks on the initial state database to generate a current state database.

Another example embodiment provides a method that includes one or more of retrieving, into a new node to be instantiated in a blockchain network, a state database checkpoint of a state database created at a block number of a blockchain of the blockchain network, retrieving, into the new node, blocks of the blockchain from the checkpoint block number to a current block number, constructing an initial state database from the received state database checkpoint, and executing, at the new node, the transactions of the retrieved blocks on the initial state database to generate a current state database.

A further example embodiment provides a non-transitory computer readable medium comprising instructions, that when read by a processor, cause the processor to perform one or more of periodically generating a state database checkpoint for a state database and blockchain maintained by a peer node of a blockchain network, obtaining a consensus on the state database checkpoint from one or more of a plurality of peer nodes of the blockchain network, and storing the consensus state database checkpoint.

A further example embodiment provides a non-transitory computer readable medium comprising instructions, that when read by a processor, cause the processor to perform one or more of retrieving, into a corrupted node in a blockchain network that is at least one or corrupted or forked, a state database checkpoint of a state database created at a block number of a blockchain of the blockchain network, retrieving, into the corrupted node, blocks of the blockchain from the checkpoint block number to a current block number, constructing an initial state database from the received state database checkpoint, and executing, at the corrupted node, the transactions of the retrieved blocks on the initial state database to generate a current state database.

A further example embodiment provides a non-transitory computer readable medium comprising instructions, that when read by a processor, cause the processor to perform one or more of retrieving, into a new node to be instantiated in a blockchain network, a state database checkpoint of a state database created at a block number of a blockchain of the blockchain network, retrieving, into the new node, blocks of the blockchain from the checkpoint block number to a current block number, constructing an initial state database from the received state database checkpoint, and executing, at the new node, the transactions of the retrieved blocks on the initial state database to generate a current state database.

DETAILED DESCRIPTION

Figure 1:
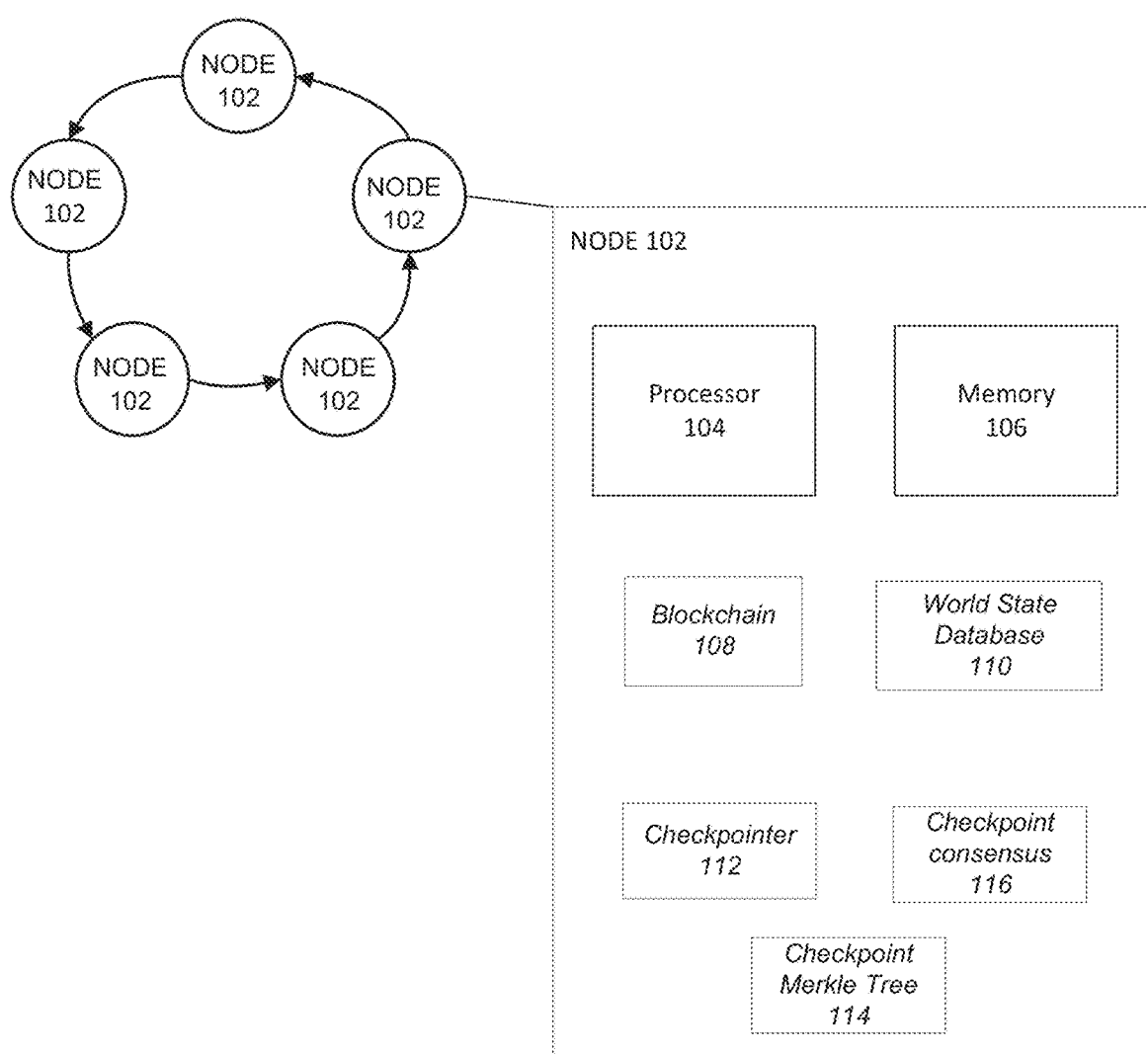
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide the ability to create checkpoints for the state database and to perform peer operations on the blockchain and the state database using the checkpoint.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include the ability to reduce the operational burden on nodes of a blockchain network by storing consensus checkpoints at the node. The checkpoints allow efficiencies at the nodes including reduction in time to instantiate a node, ability to quickly restore a corrupted or forked node, and the ability to more efficiently store the blockchain at the node.

One of the benefits of the example embodiments is that it improves the functionality of a computing system by improving the speed at which new nodes can join a blockchain and/or existing nodes can recover from disk errors, chain forks, etc.

FIG. 1 illustrates a logic network diagram 100 of a blockchain network according to example embodiments. Referring to FIG. 1, the network 100 includes a plurality of peer nodes 102. Each peer node 102 includes at least one processor 104 and an operatively associated memory 106. The memory 106 may include memory for one or more instruction sets, applications, software etc. as well as memory for storing a blockchain 108 and a state database or ledger 110. The memory 106 may also include random access memory for executing the one or more instruction sets, applications, software etc. to perform one or more functions of the blockchain network. The memory 106 may also include memory for storing data including a blockchain and a state ledger database.

In accordance with example embodiments, the node 102 may also execute a checkpointer 112 that generates a checkpoint state 114 of the state database. In one or more embodiments, the checkpointer 112 takes care of deterministically computing a state hash at a checkpoint interval (m) and also a tamper proof state dump (which would be the dump of all states as of block height h, being a multiple of m. A consensus process 116 may also execute once the checkpointer 112 has completed the hash computation to ensure that the checkpoint state 114 that is stored has consensus across the peer nodes 102 of the blockchain network 100 and to detect whether the node is corrupted or forked. It should be noted that the checkpoint consensus is a separate and distinct process to the transaction consensus typically performed on blockchain transactions. The checkpoint 114 is a representation of the word state database 110 at some previous point in time, e.g. at a particular block number of the blockchain. In particular embodiments as will be described in more detail below, the checkpoint state 114 may be generated and stored as a merkle tree representation which has particular advantages for determining checkpoint consensus across the peer nodes of the network 100. These advantages include parallel computation, storage of large amount of data, supports incremental computation, and easy proof of present state in the blockchain by sharing a very minimal state. Overall, these properties allow for a data structure to efficiently arrive at a checkpoint and also generate a tamper proof state dump of a large data set. However, some or all of the properties may not be required or desired in all embodiments and other data structures may be equally viable. For example, a variety of hash trees can be used such as merkle tree, red black merkle tree, tiger hash tree, etc.

In some embodiments, it may be possible to use other data structures, such as a simple data bucket or array data structure. For example, all states may be collected in a data bucket and then a hash calculated for the bucket. A checkpoint can be created on the hash and store the whole bucket along with the hash after consensus. While feasible, this arrangement is less suitable for large data due to memory constraints, incremental computation is not possible and to prove that a particular state is not tampered with, the whole of the data needs to be sent along with the hash.

The peer nodes are configured to communicate with each other via various protocols, including peer to peer protocols, through a communications network. Typically, the communication network will include the internet and its associated protocols. The specific method by which the peer nodes communicate is not considered pertinent to the present application and many forms of communication systems will be apparent to the person skilled in the art.

The particular form of the blockchain network 100 is not considered pertinent to the present application. The blockchain network 100 may execute proof-of-work or proof-of-stake algorithms for committing new blocks to the blockchain. Alternatively or in addition, the blockchain network 100 may be a permissioned blockchain using an endorsing and/or ordering node for committing blocks to the blockchain. A particular form of a permissioned blockchain network 100 will be described in further detail below.

Figure 2A:
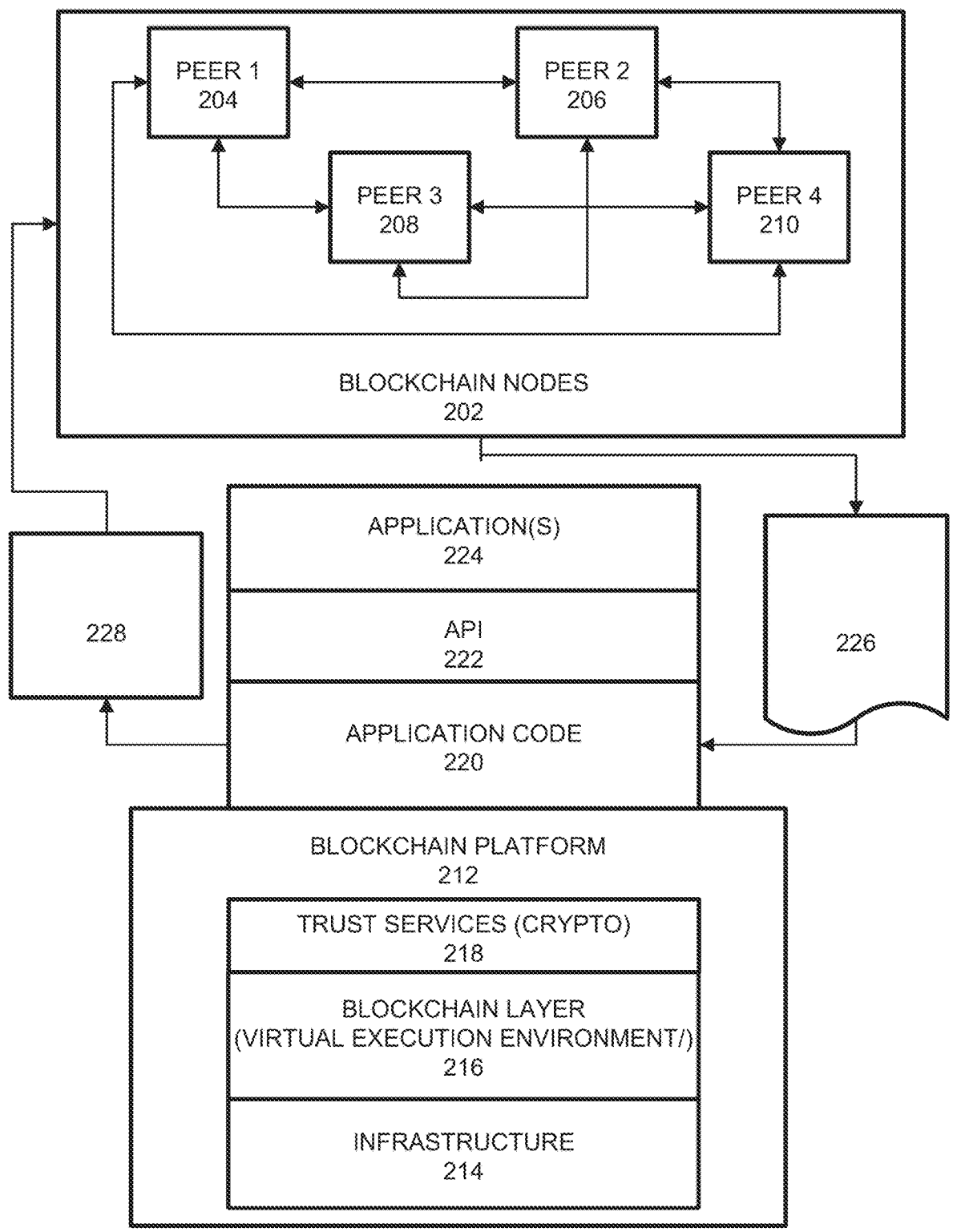
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226, such as transaction requests, may be processed by one or more processing entities (e.g., virtual machines) included in the blockchain layer 216. The result 228 may include the outcome of the transaction request, e.g. a complete transaction. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a peer node may process a transaction request 226. One function may be to process the transaction request to produce a transaction result, which may be provided to one or more of the nodes 204-210.

Figure 2B:
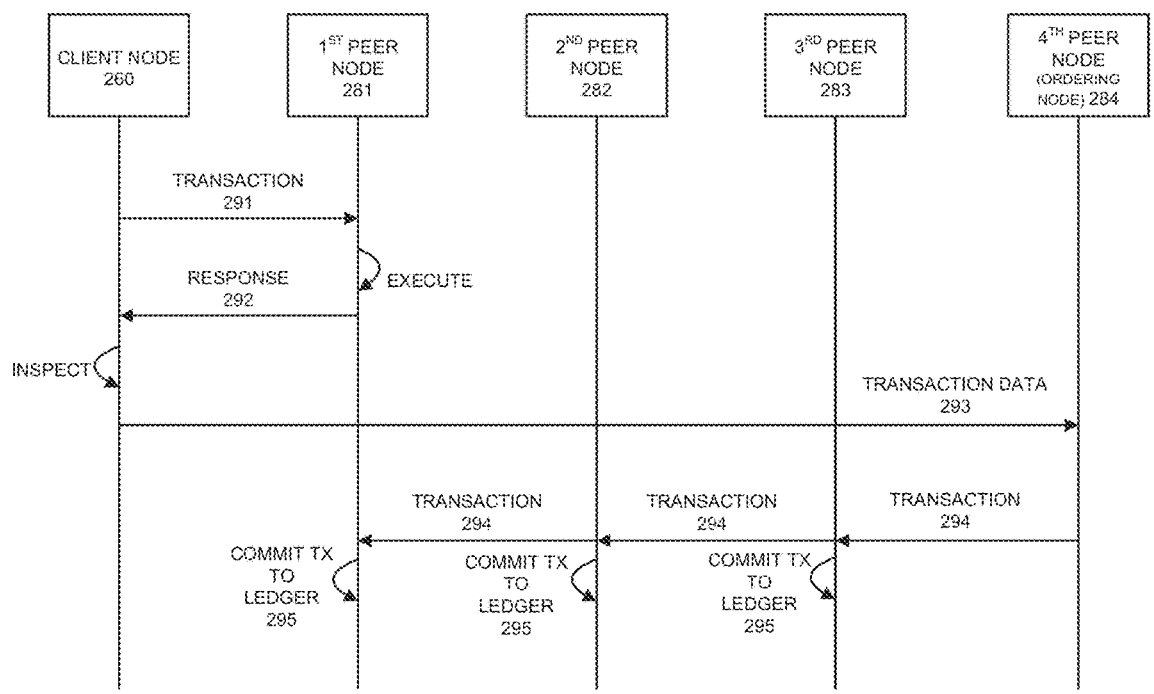
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
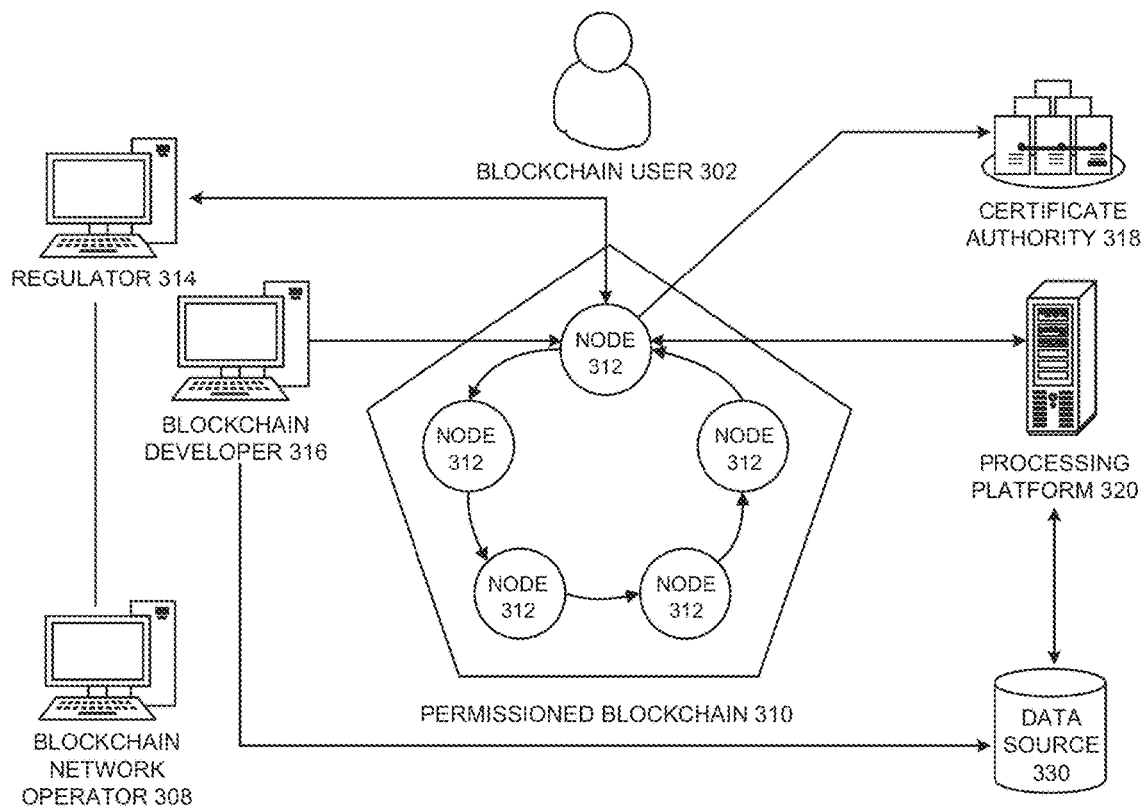
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
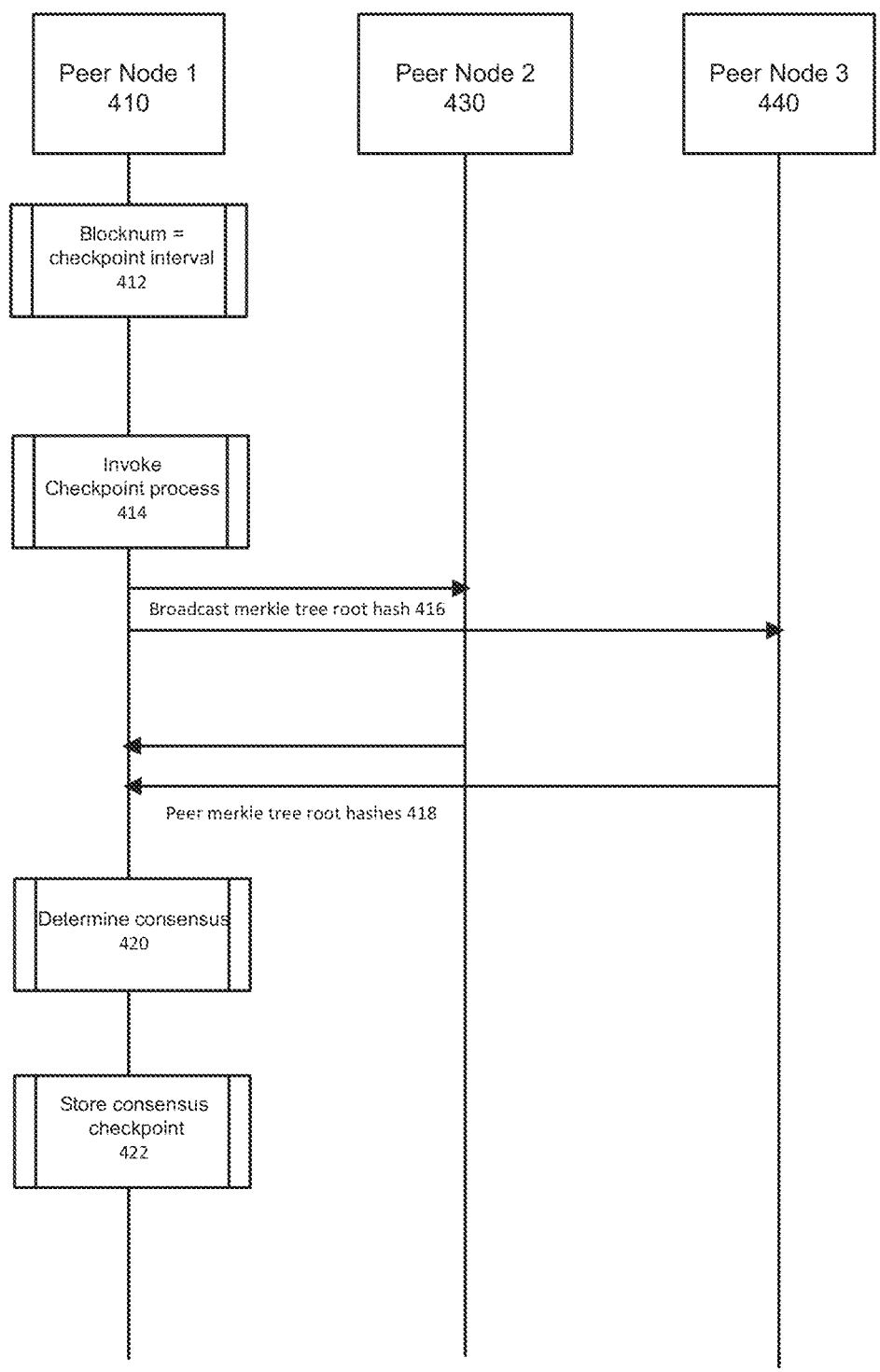
FIG. 4 illustrates a system messaging diagram, according to example embodiments.

FIG. 4 illustrates a system messaging diagram for performing a consensus checkpoint method, according to example embodiments. Referring to FIG. 4, the system diagram 400 includes three peer nodes 410, 430, 440 that each maintain copy of the blockchain and the state database. While three peer nodes are shown, the blockchain network may contain any number of peer nodes. Each node executes a thread/subprocess for performing a consensus checkpoint procedure. In one embodiment, the chaincode specifies that a checkpoint should be created every 'm' blocks committed to the blockchain. The chaincode may run in the background of the node until the current block number of the blockchain matches the next checkpoint interval 412. The checkpoint procedure is then invoked 414 and the node generates a checkpoint state. In one embodiment, the checkpoint state is created as a merkle tree. The node 410 broadcasts the root hash of the merkle tree 416 to the other peer nodes 430, 440 of the network and similarly receives the root hash 418 generated by the same checkpoint procedure running on those nodes. The node 410 applies a consensus requirement to determine if there is consensus regarding the node's checkpoint state 420. In one embodiment, consensus may be determined if the peer receives the same root hash from a majority of peers. If consensus is achieved, then the merkle tree is stored as a checkpoint in the node 422. If the node does not detect consensus, then the node may seek to resolve the lack of consensus as will be described in more detail below.

Figure 5A:
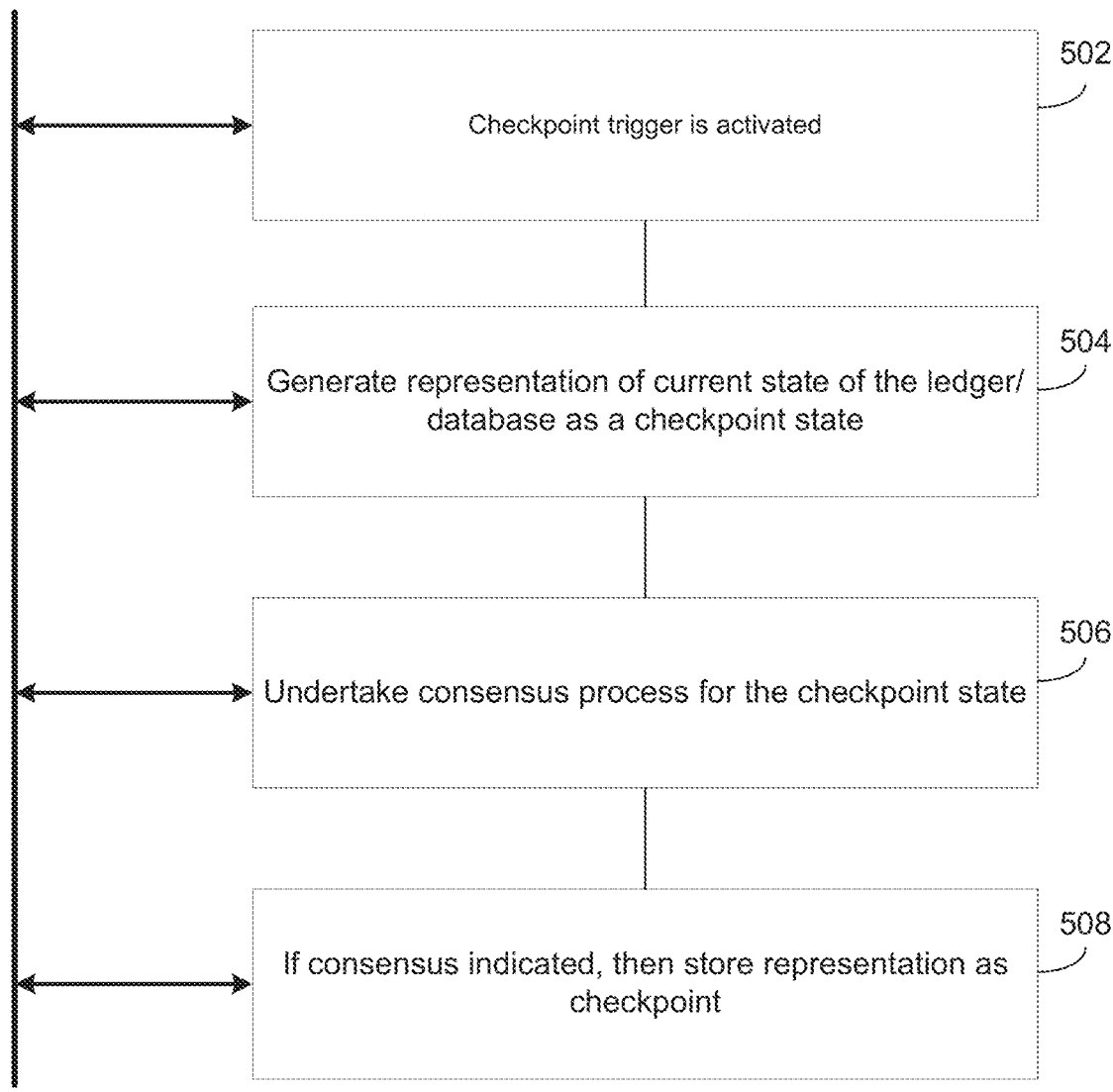
FIG. 5A illustrates a flow diagram, according to example embodiments.

FIG. 5A illustrates a flow diagram 500 of an example method for consensus checkpointing of a world state in a blockchain, according to example embodiments. With reference to FIG. 5A, at step 502, a checkpoint trigger is activated. The checkpoint trigger may be a block counter that detects that an interval number of blocks have been committed to the blockchain. For example, the checkpoint trigger may activate every "m" blocks. In one embodiment, the checkpoint trigger may activate every 1000 blocks, though any value of "m" may be chosen. The value of "m" may be dependent on various factors including, without limitation, the frequency or rate at which new blocks are created, the typical number of transactions recorded per block, the size of the state ledger, etc. The checkpoint trigger may be a component executing locally within each peer node, or may be a central trigger, e.g. executed by an endorsing node or ordering node of the blockchain network that broadcasts a checkpoint trigger signal to each peer node.

Once the checkpoint trigger is activated, each peer node generates a representation of the current state of the database 504. In one embodiment, each node generates a merkle tree representation of the current state with the key/value pairs in the leaf nodes of the merkle tree. The process and schema for generating the merkle tree may be established by policy and executed by a dedicated thread/sub-process to ensure that each node generates the merkle tree by the same process. At step 506, nodes undertake a consensus process for the checkpoint state. In the merkle tree example, it is not necessary to submit the entire representation for consensus. Instead, it may be sufficient for just the root hash of the merkle tree to be submitted.

To perform consensus, each node broadcasts its root hash of the merkle tree to each other peer node. A peer node receives the root hashes of its peers and compares each received root hash to the peer's own generated root hash. Any consensus algorithm may be utilized including, without limitation, Raft, PBFT, Paxos, Voting, etc. If consensus on the current state is reached, the peer node may store the current state as a checkpoint 508. Consensus may be determined based on a policy. In one embodiment, consensus may be determined if the peer receives the same root hash from a majority of peers. The person skilled in the art will readily understand that more or less stringent consensus requirements may be set.

The merkle tree may be generated using several methods. In one embodiment, a fresh hash computation is performed at each checkpoint interval. When the checkpoint time is reached, a range query is used to retrieve all key value pairs from the database. A set of key/value pairs is allocated to each leaf node. Rules and policies may be set to determine the number of key/value pairs allocated to each data bucket of the leaf node. Once the data bucket of a leaf node is fully allocated with its set of key/value pairs, the merkle tree hash computation can commence, without waiting to retrieve and allocate all entries from the database to all of the leaf nodes.

The whole merkle tree (including leaf nodes which contains key/value pairs) can be dumped to a separate storage unit as a backup (checkpoint). Only the recent merkle tree need be stored in the peer.

Performing a fresh and complete hash of the state database at each checkpoint provides a simple implementation of a checkpoint method and is efficient when the checkpoint interval "m" is large, e.g. every 1 million blocks, and/or when the key/value pair modification rate is high. However, because there is no reuse of past computation, there can be a sudden load on the state database, though work stealing can be used to avoid this sudden surge in resource utilization.

In a work stealing approach:

G=(next checkpoint block number)−(current checkpoint block number);

M—Denotes the number of entries in the state DB.

After every block commit, $p*(M/(0.9*G))$ entries are fetched from the database to construct the merkle tree. The value of p ($>=1$) is dependent on the available CPU and disk bandwidth (which can be identified by fetching these details periodically from the operating system).

Figure 5B:
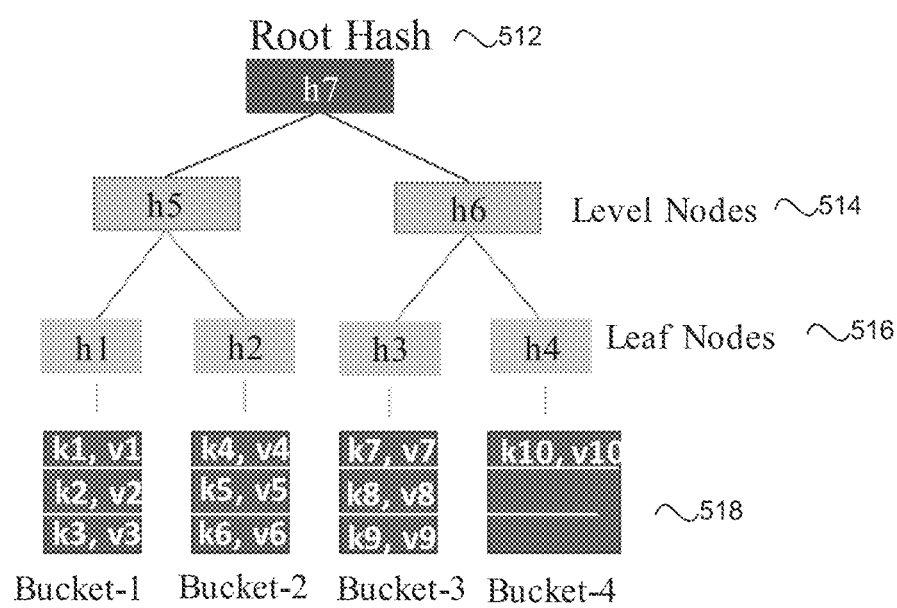
FIG. 5B illustrates an example merkle tree, according to example embodiments.

FIG. 5B shows a merkle tree 510 produced using the fresh hashing protocol. As shown in FIG. 5B, the merkle tree leaf nodes 516 provided data buckets 518 that are filled sequentially with key/value pairs until the memory allocation of a leaf node is full. The final leaf node in the tree may have spare data resource. The level nodes 514 contain a concatenation hash of the child nodes, and this may extend through multiple levels to the root node 512 which contains the root hash.

Because the checkpoint process may occur concurrently with the normal operation of blockchain network, new blocks may be committed to the blockchain and the StateDB may change while the checkpoint process is occurring. To ensure that the correct state of key/value pairs, i.e. the state existing at the checkpoint block number, is used to generate the checkpoint merkle tree, backup of old values of key/value pairs should be taken in any future block commits from the checkpoint block number up until the checkpoint has been created. Thus, when the checkpoint process retrieves a key/value pair from the StateDB, if version(key) >the checkpoint block height, the key/value pair is retrieved from backup. For deletes of state during a block commit while the checkpoint is being generated, the state (key/value pair) should not be actually deleted from the database or else range queries would not return that state and the checkpoint would not falsely omit that key/value pair from the checkpoint merkle tree. Instead, separate bookkeeping of delete states is undertaken so that these states persist in the StateDB and subsequent transactions to read/modify these states are prevented. However, the range query used for the checkpoint should be able to read and retrieve these states. Once the checkpoint hash computation is done, the states which are bookmarked as deleted from the StateDB can be actually deleted from the StateDB.

Figure 5C:
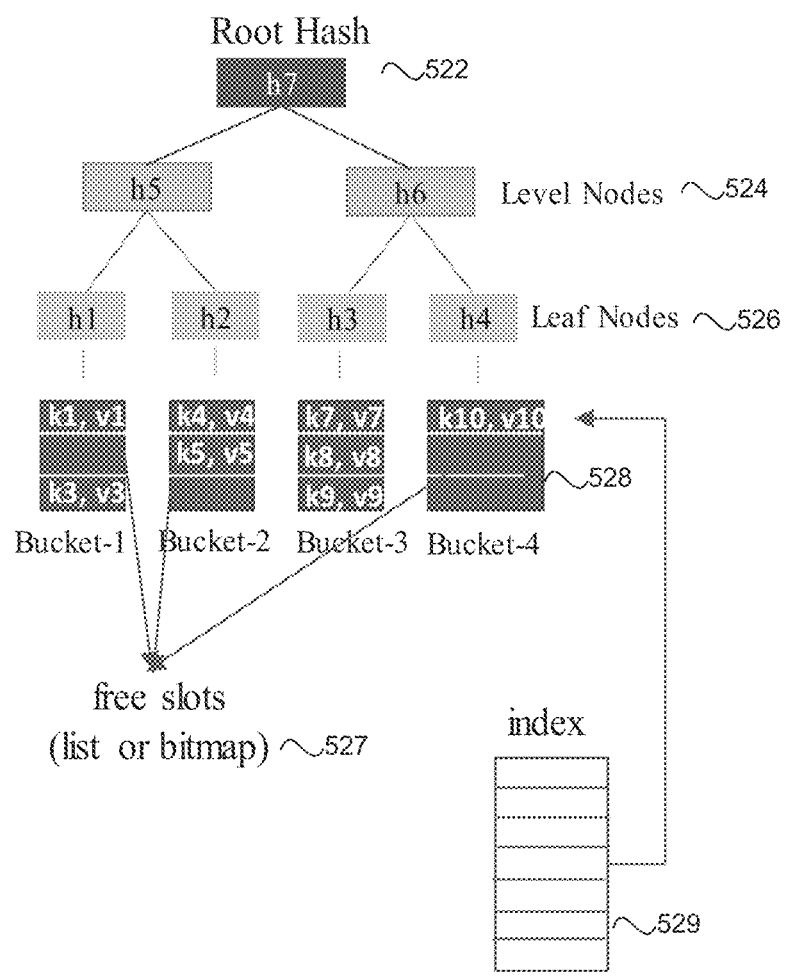
FIG. 5C illustrates an example merkle tree generated using an index based incremental hash computation method, according to example embodiments.

An alternative checkpoint method relies on incrementally computing the merkle tree with an accompanying index. As shown in FIG. 5C, the leaf node 526 of the merkle tree 520 is a data bucket 528 that contains a fixed number of key/value pair slots. For example, a leaf node 526 may be configured to accommodate 100 key/value pairs, though a bucket may be of any appropriate size as will be readily determined by the person skilled in the art. To accompany the merkle tree 520, two additional data structures may be required. There may be a Bitmap index or a free list 527 to denote the next free slot in the merkle tree and a hierarchical index 529 to keep the key as index-key and pointer to the leaf node/slot. The level nodes 524 contain a concatenation hash of the child nodes, and this may extend through multiple levels to the root node 522 which contains the root hash.

The merkle tree may be constructed using four operations as follows.

Insert (Key, Value)

Find the first free slot in the leaf nodes and insert the key/value in the free slot and mark the bucket as dirty (i.e. modified).

Delete (Key)

Delete the key/value pair from the leaf node and add the slot to the free list. Mark the bucket as dirty.

Update (Key, Value)

Update the key/value pair in the leaf node and mark the bucket as dirty

RecomputeHash( ) or FinalizeHash( )

Depending upon the dirtied leaf nodes (a.k.a bucket), recompute the merkle root hash.

After every 'c' blocks within a checkpoint interval 'm', all valid write sets from last 'c' blocks are taken to form a partially ordered set. From the partially ordered set, the maximal elements are chosen to form a final write set. For example, if the same key is modified in block 5 and block 6, only the key/value pair in block 6 would be considered.

The value "c" is decided dynamically based on the number of key/value pairs in the final write set and available CPU resource & disk bandwidth For each key/value pair in the final write set (combining last 'c' blocks), one of the three merkle tree modification operations described above would be performed. That is, for each key/value pair in the final write set, the system would perform:

Delete operation on the merkle tree & update the index;

Update operation on the merkle tree (if the index lookup succeed);

Insert operation on the merkle tree (if the index lookup fails) & update the index.

Once all of the key/value pairs in the final write set have been processed, the merkle root hash is computed depending upon the dirtied buckets or leaf nodes. These processes can be performed just before reaching the checkpointing interval.

For this method, the expected load on the state database is less when compared to fresh computation of the hash at each checkpoint interval. In addition, checkpointing latency, i.e. the time taken to complete the checkpointing consensus/process, may be less. This method is particularly suitable when the checkpoint interval is very small though the method has additional complexity compared to fresh computation of the merkle tree, including the requirement to maintain the index.

Figure 5D:
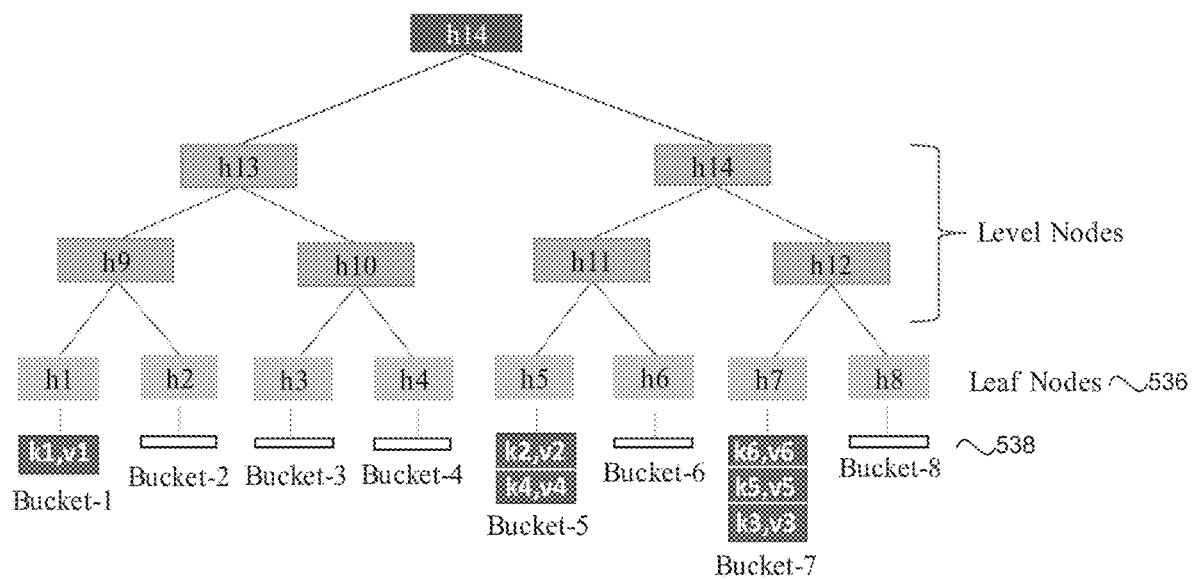
FIG. 5D illustrates an example merkle tree generated using a hash function based incremental hash computation method, according to example embodiments.

A further alternative checkpointing method uses hash function based incremental hash computation every "c" blocks within the checkpoint interval "m". As shown in FIG. 5D, in this approach, there are an initial "p" buckets 538 each forming a leaf node 536 of the merkle tree 530. Each bucket or leaf node can hold any number of key/value pairs and thus the number "p" remains fixed until such time as the merkle tree computation becomes inefficient. For a given key/value pair, a hash function would be used to decide the destination bucket.

There are four operations used to construct the merkle tree as follows:

Insert (Key/Value)

Hash(key) determines the bucket or leaf node in the merkle tree. Given that the key does not exist already in the leaf node, an insert of key/value is executed and the leaf node is marked as dirty (modified).

Delete (Key)

Hash(key) determines the bucket or leaf node in the merkle tree. Linear or binary search to find the key and delete the key from the leaf node. Mark the leaf node as dirty.

Update (Key/Value)

Hash(key) determines to a bucket or a leaf node in the merkle tree. Linear or binary search to find key and update the key/value pair in the leaf node. Mark the leaf node as dirty.

RecomputeHash or FinalizeHash

Depending upon the dirtied leaf node(s), recompute the merkle root hash.

The blockchain network may implement a consistent way across peers to identify that the current p buckets/leaf-nodes are inefficient for the number of states or key/value pairs. Consensus would be required to increase the number of buckets or leaf nodes. Once the majority of the nodes agree, a new merkle tree would be created with a higher number of buckets. Rehashing by doing a range query on the state database (as described for the fresh hash computation) could then produce the new merkle tree.

This method has advantage over the previous incremental method in that index management is not required because the leaf node is determined by a hash of the unique key. Thus, there is a lesser number of lookup operations required during search for update/delete operations. However, rehashing or restructuring of the merkle tree may be required when the bucket size is unbalanced (costlier) and there is a cost associated with the hash function.

The use of checkpoints for the state database allow certain efficiencies to be achieved and additional operations to be performed.

Figure 5E:
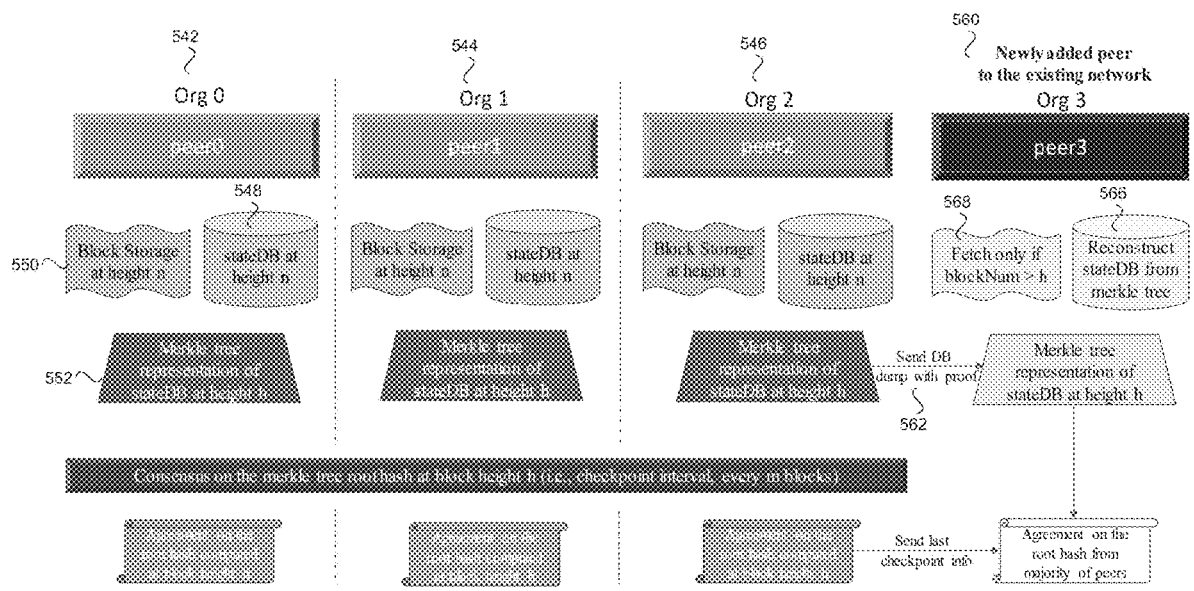
FIG. 5E illustrates a process for instantiating a new peer node on a blockchain network, according to example embodiments.

The checkpoint state of the database can make node bootstrapping of new nodes more efficient by reducing the bootstrapping duration. FIG. 5E component diagram 540 shows three instantiated peers, Peer0 542, Peer1 544, Peer2 546, that each operate a state database 548 at the current block height 'n' and block storage 550 also at height 'n'. As will be described in more detail below, the block storage may comprise archived block storage of old blocks and fast access storage of more recently committed blocks up to the current block "n". Owing to differences in computing power between nodes and the speed at which nodes can commit blocks to the blockchain, at any given point in time there can be small differences in the specific height "n" between nodes.

Each instantiated peer also stores a consensus Merkle tree representation 552 of the stateDB at block height h, being the block height at the last checkpoint interval. Typically, 'h' will be an integral multiple of 'm', the checkpoint interval. When a new node joins, e.g. Peer3 560, rather than executing all of the transactions on the blockchain to create the current state, the new node can obtain the merkle tree representation of the state of database at the last checkpoint interval from a peer node 562 together with a set of proofs, e.g. the consensus hash, to verify that the shared state is not tampered with. Specifically, the receiving node can verify the proof by rebuilding the merkle root hash using the leaves of the received merkle tree and then checking whether the constructed root hash matches with the root hash in the consensus. If there is a match, then the state is not tampered with. If there is a mismatch the hashes in the level nodes can be checked to identity which bucket or leaf node is tampered with. Then, the node can retrieve that particular bucket from other nodes. This process is described in more detail below with reference to FIG. 5H.

Because the merkle tree representation includes each key/value pair of the state DB in the leaf nodes of the merkle tree, the new peer 560 can generate the state DB by copying each of these key/value pairs to the peer's own database as an initial state database 566. The peer can then fetch the blocks of the blockchain since the last checkpoint 568, i.e. where Blocknum >h, and run only the transactions of these blocks on the state DB to produce the final current state of the DB. Confirmation that the new peer has established correctly can be undertaken firstly by verifying that the root hash of the checkpoint state of the stateDB matches the consensus root hash, and then at the next checkpoint interval when the peer will generate its own merkle tree on its own current state and submit for consensus. The peer can instantiate the blockchain by retrieving the blocks of the blockchain from block 1 up to the current block, or alternatively up to the last checkpoint, out of band if required. These blocks may be stored in archive storage as will be described in more detail below.

Figure 5F:
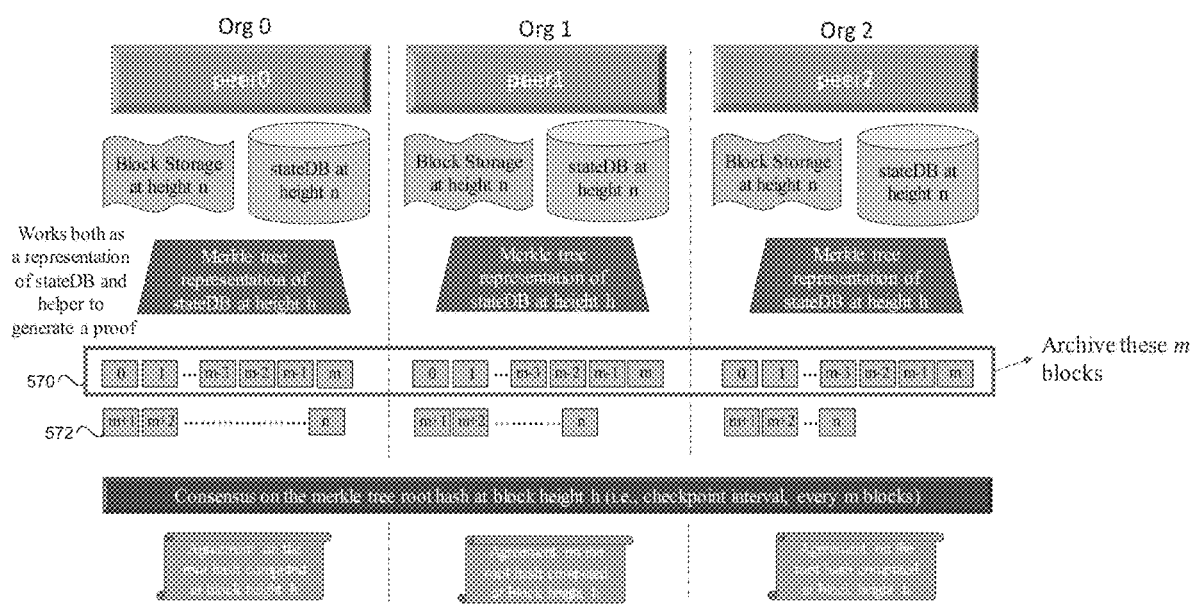
FIG. 5F illustrates a process for archiving data of a blockchain, according to example embodiments.

The checkpoint allows more efficient use of disk space. As shown in component diagram 569 in FIG. 5F, each peer node stores the StateDB at the current block height and a checkpoint of StateDB at the last checkpoint height 'h'. Typically, 'h' will be an integral multiple of the checkpoint interval 'm'. Each peer node further stores the block storage at height 'n'. A peer node may include various types of data storage, including hard disk drive (HDD) and solid-state drives (SSD). Typically, a peer might store the blockchain on SSD allowing for data to be quickly accessed, fast read/write, etc. However, for large blockchains, full storage on SSD may become expensive. After a state checkpoint, nodes can remove blocks from the block storage to free up the storage. The node may remove/purge/prune the blocks or archive blocks to a slow storage to conserve space. As shown in FIG. 5F, each peer includes the blocks up to the last checkpoint interval m (i.e. blocks 0 . . . m) 570 and blocks since the last checkpoint, m+C1, m+2 etc. 572. Blocks 0 to m can be moved to alternative disk storage, which may, for example, allow a smaller SSD storage to be deployed at the node.

Figure 5G:
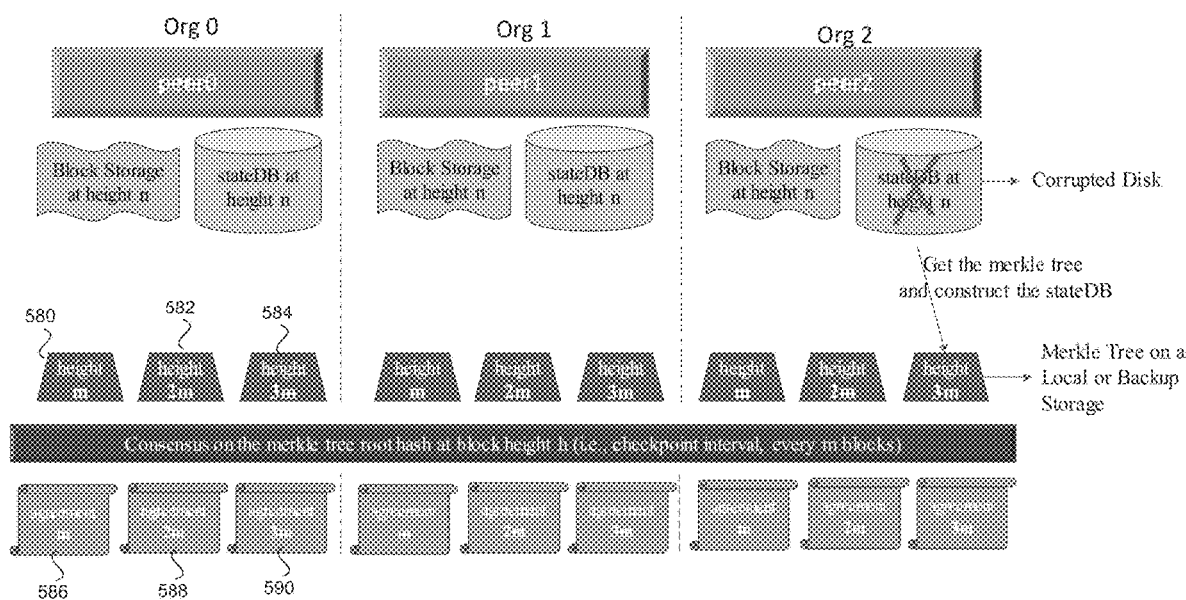
FIG. 5G illustrates a process for corrupt disk recovery at a peer node, according to example embodiments.
Figure 5H:
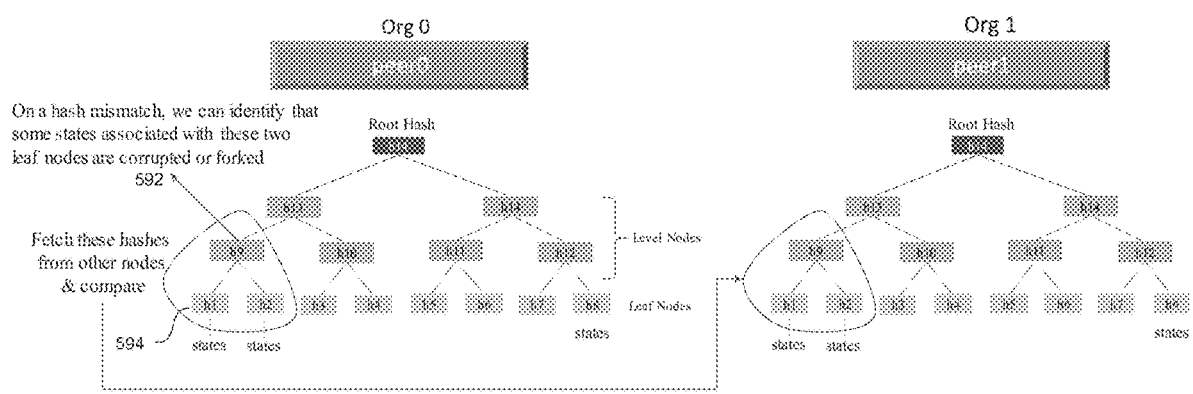
FIG. 5H illustrates a process for isolating leaf nodes causing a merkle tree discrepancy to detect and recover from a fork, according to example embodiments.

The checkpoint may be used to quickly recover from a disk corruption/fork and to perform a Point-in-Block recovery. As shown in component diagram 579 in FIG. 5G, after every checkpoint, the whole Merkle tree (including the data in leaf nodes) can be stored as a backup. Thus, each peer may store checkpoints at successive checkpoint intervals, e.g. checkpoint m 580, checkpoint 2$m$ 582, checkpoint 3$m$ 584, etc. and associating consensus data for each of these checkpoints, 586, 588, 590. Using the old Merkle tree stored in a backup, a peer can go back in time, recover from disk corruption and fork.

Point-in-Block recovery may also be used to correct from a mistake or recover from an attack. For example, in a network consisting of banks, say the block 100 had a transaction which was submitted mistakenly or was an attack by a hacker. At that time, banks may not identify the attack. Later, when the banks come to find the attack, bank expects some of the transactions which were submitted after block 100 to be executed on the wrong data. Instead of finding which transactions to be reverted (which might be very difficult), all banks in the network can agree to go back in time to a checkpoint which was created before block 100 (using the merkle tree state dump) and invalidate the transaction submitted by the attacker. Then, the blockchain network can revalidate transactions that was submitted after the 100th block.

As described above, consensus on the root hash of the merkle tree may be required in order for the merkle tree to be established as a checkpoint. If, for any peer, the peer's root hash differs from the consensus root hash, a comparison between the peer's merkle tree and the consensus merkle tree may be used to locate the source of the discrepancy. As shown component diagram 589 in FIG. 5H, the hashes of each level node 592 can be compared to identify the branch, and ultimately the leaf nodes 594, where the hash mismatch occurs. The peer may correct the state by restoring the merkle tree at the previous checkpoint, retrieving the blocks since the previous checkpoint from a non-corrupted or forked node, and re-executing the transactions of the blocks to restore the current state.

An advantage of the present embodiments described herein includes that the checkpoint method is significantly agnostic with regard to state databases, machine architectures, file system types, etc. The checkpointing methods provide an efficient computation of the Current State Hash for checkpointing (every 'm' blocks) and generation of tamper proof State dump in a single meta-operation.

Figure 6A:
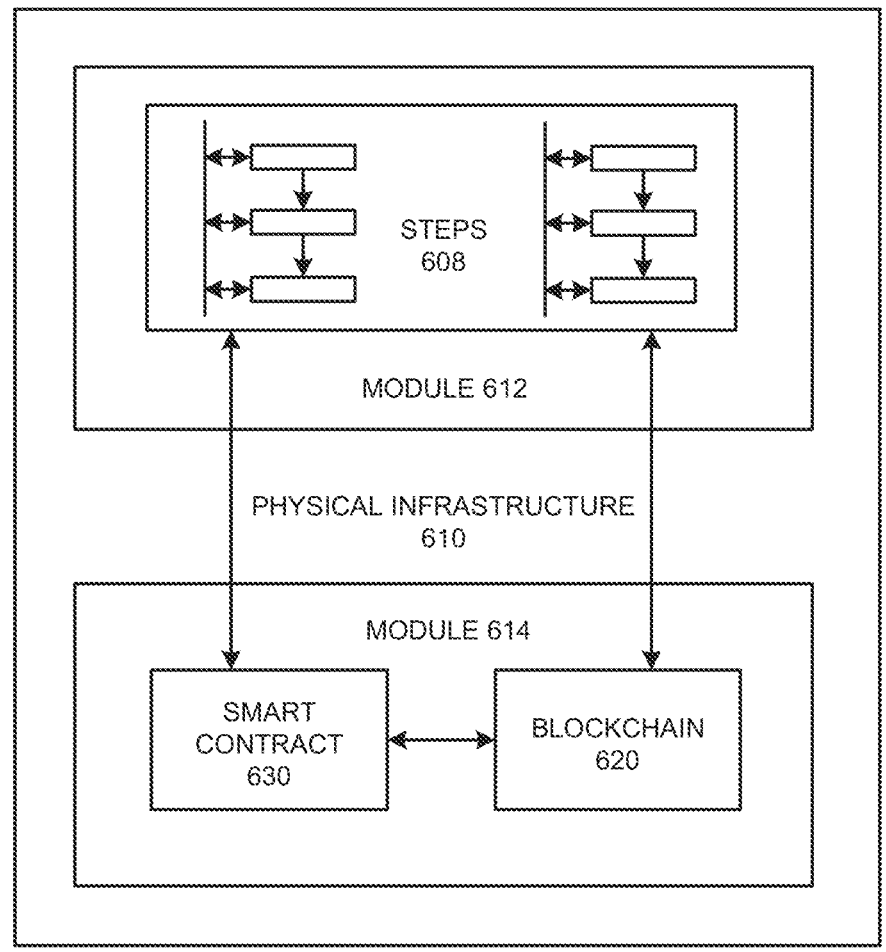
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
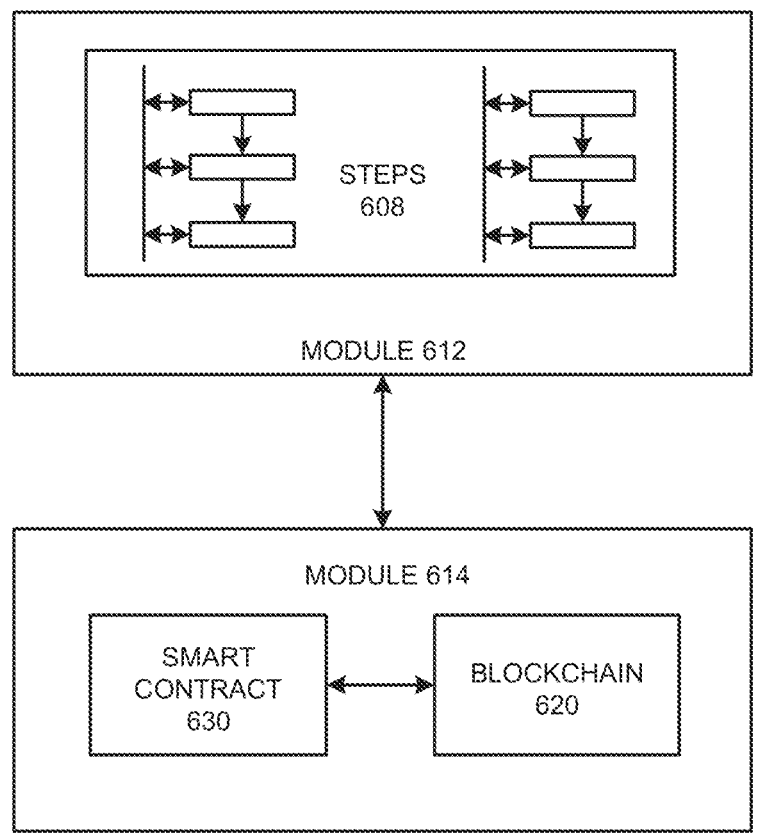
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
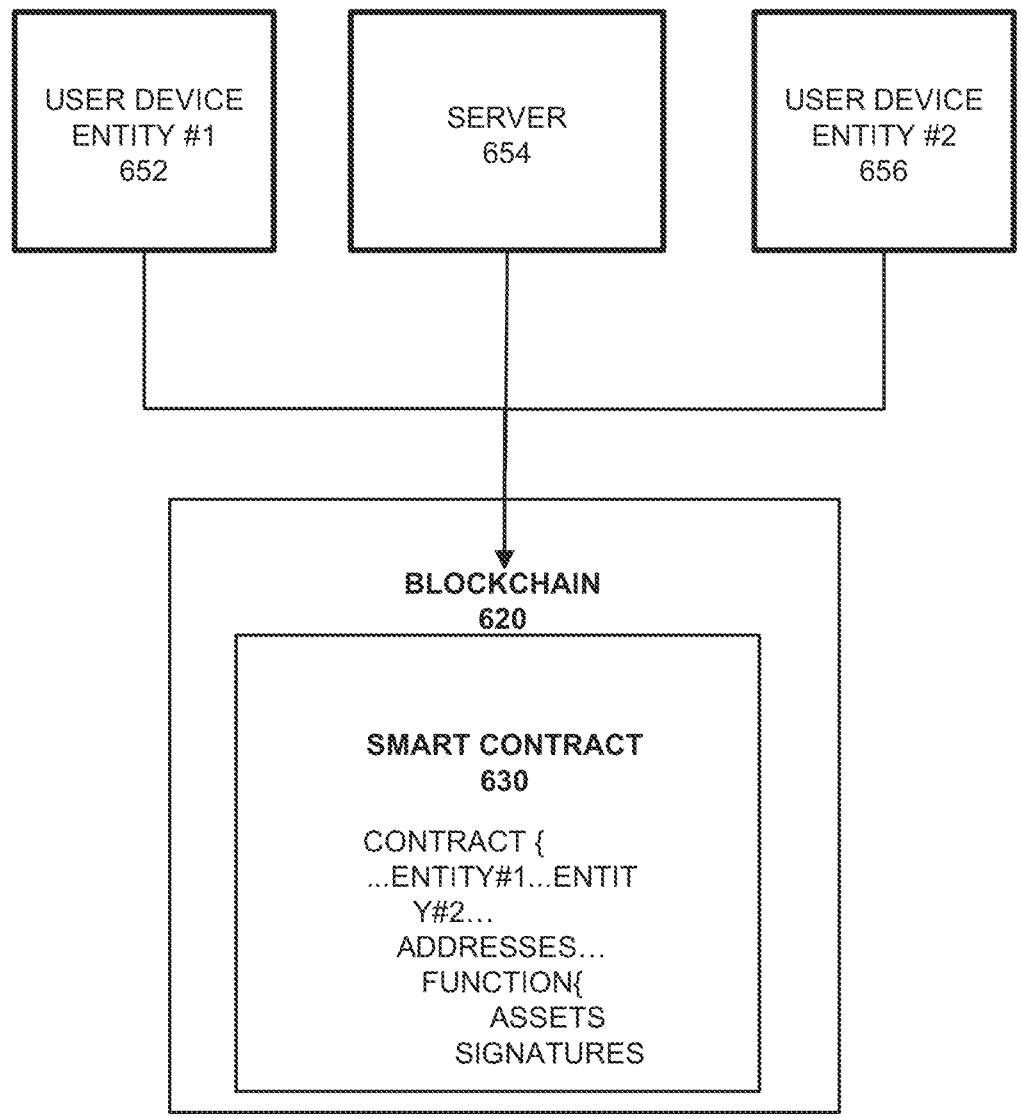
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
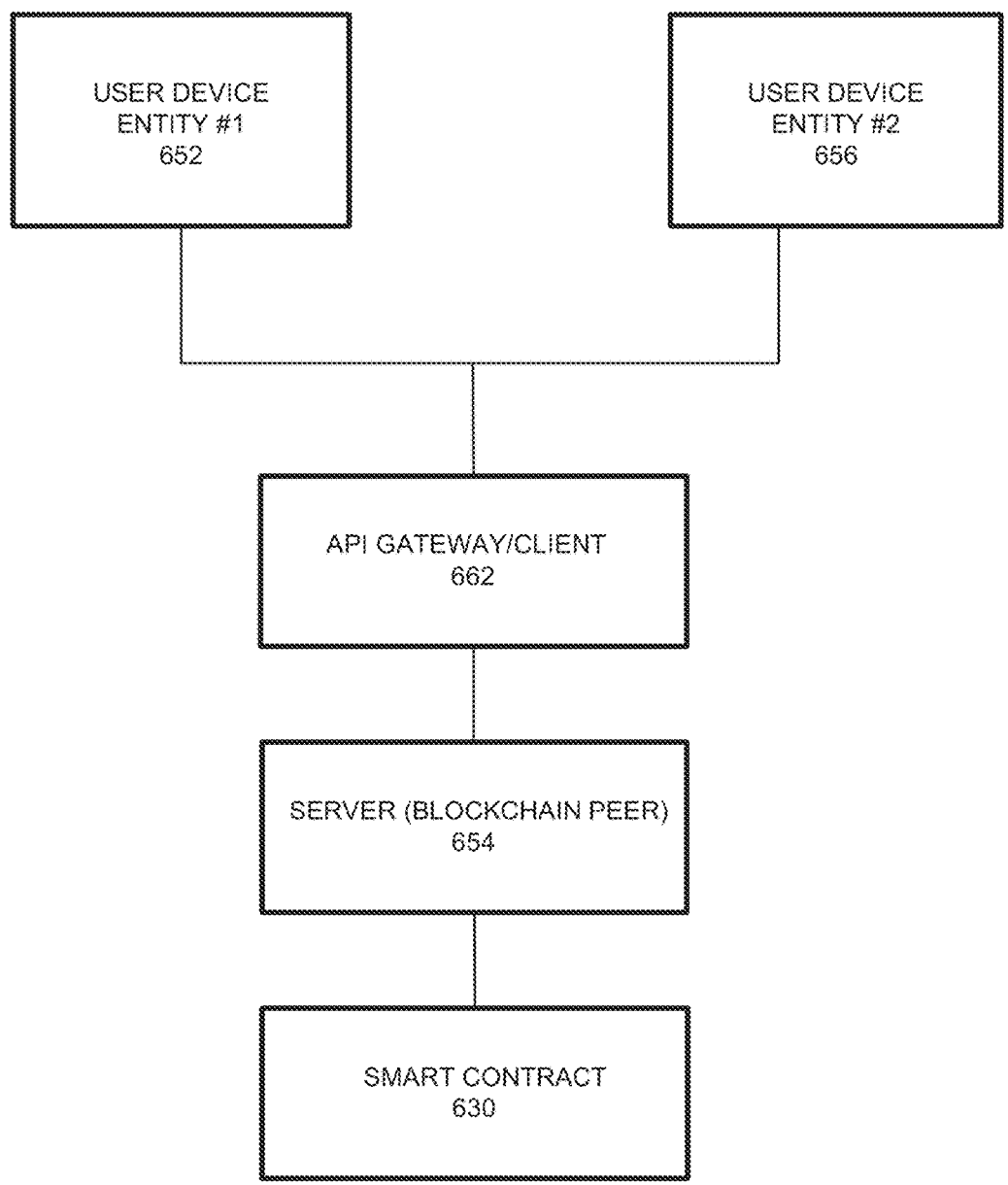
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
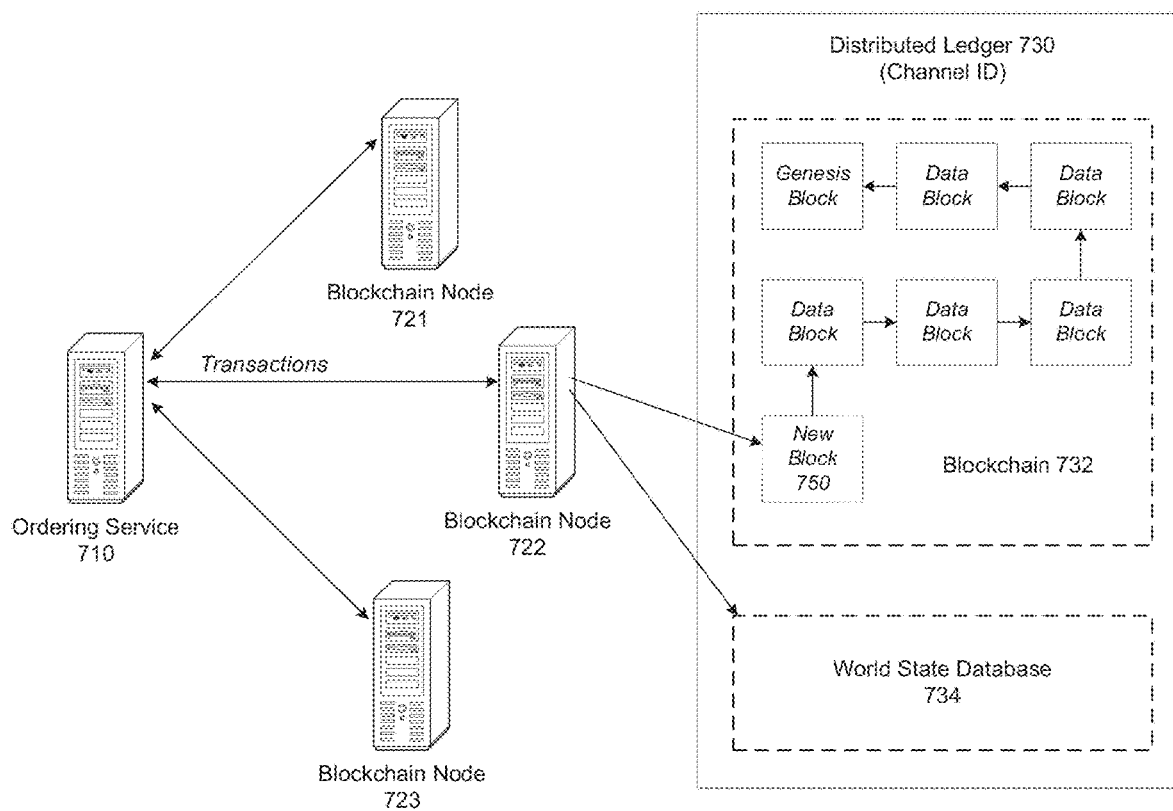
FIG. 7A illustrates a process of new data being added to a database, according to example embodiments.
Figure 7B:
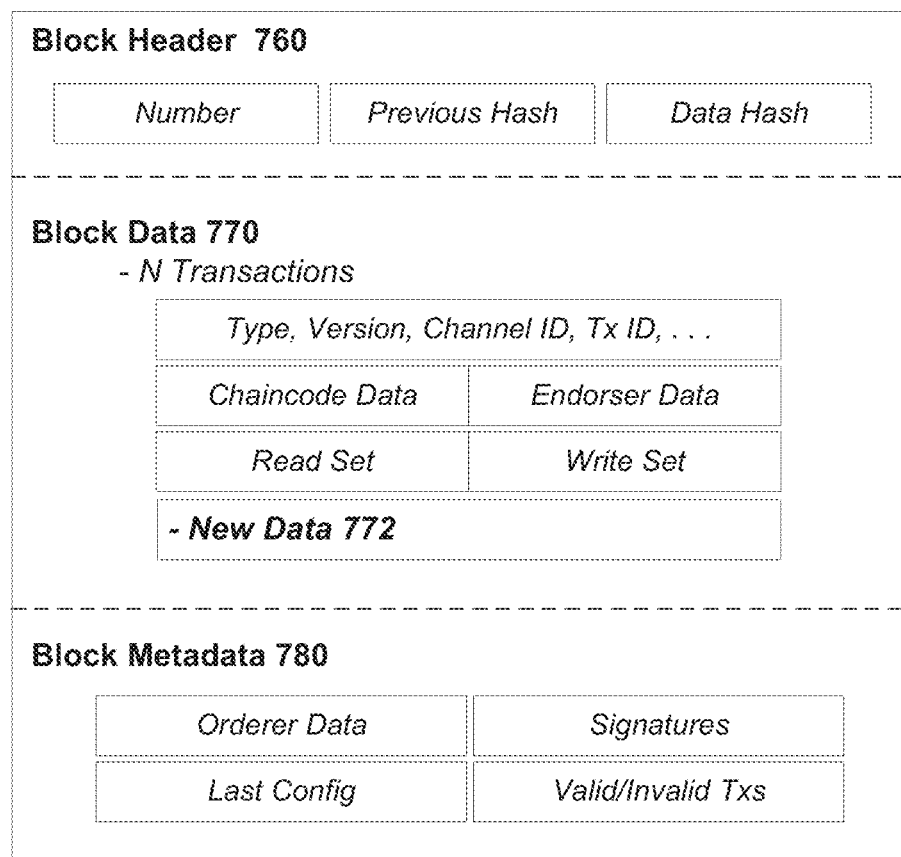
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger

730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
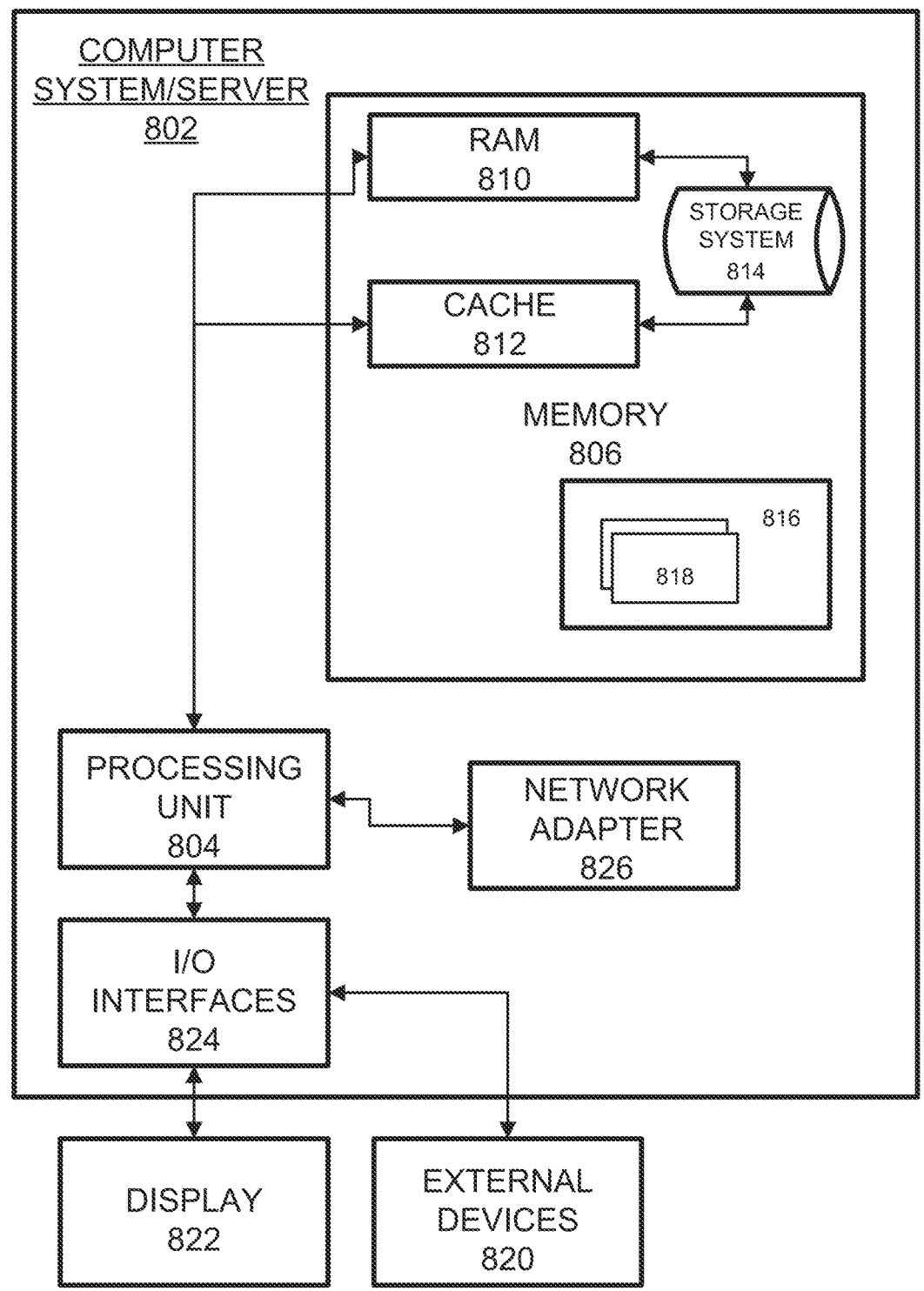
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
   a blockchain network comprising a plurality of peer nodes programmed to store a blockchain and a state database, wherein
   a peer node, of the plurality of peer nodes, is programmed to:
      determine that the peer node is at least one of corrupted or forked;
      retrieve a state database checkpoint of a state database created at a block number of the blockchain, the state database checkpoint comprising a last known non-corrupted or non-forked checkpoint state;
      retrieve blocks of the blockchain from the block number, at which the state database checkpoint is created, to a current block number;
      construct an initial state database from the retrieved state database checkpoint; and
      execute transactions of the retrieved blocks on the initial state database to generate a current state database,
   wherein one or more key/value pairs of the initial state database are stored in one or more leaf nodes of a merkle tree representing the state database checkpoint.

2. The system of claim 1, wherein the state database checkpoint is a merkle tree comprising:
   one or more key/value pairs in one or more leaf nodes of the merkle tree, wherein the peer node is programmed to extract and store the one or more key/value pairs from the one or more leaf nodes of the merkle tree to construct the initial state database.

3. The system of claim 1, wherein the peer node is programmed to:
compare a root hash of the merkle tree with a consensus root hash for the state database checkpoint.

4. The system of claim 1, wherein the peer node is programmed to:
generate the merkle tree representing the state database checkpoint in accordance with a defined merkle tree schema.

5. The system of claim 1, wherein the peer node is programmed to:
receive a consensus merkle tree into the peer node; and
compare hash values of one or more level nodes of the consensus merkle tree and a merkle tree generated by the peer node to isolate one or more leaf nodes that contain one or more discrepancies in one or more key/value pairs.

6. The system of claim 1, wherein the peer node is programmed to request the state database checkpoint and the blocks of the blockchain from an existing node of the blockchain network.

7. The system of claim 1, wherein the peer node is programmed to generate a state database checkpoint at a next checkpoint interval of a number of blocks of the blockchain and determine the peer node as correctly instantiated if the state database checkpoint matches a consensus state database checkpoint.

8. A method comprising:
retrieving, by a node in a blockchain network, the node being at least one of corrupted or forked, a state database checkpoint of a state database created at a block number of a blockchain of the blockchain network, the state database checkpoint comprising a last known non-corrupted or non-forked checkpoint state;
retrieving, into the node, blocks of the blockchain from the block number, at which the state database checkpoint is created, to a current block number;
constructing an initial state database from the retrieved state database checkpoint; and
executing, at the node, transactions of the retrieved blocks on the initial state database to generate a current state database,
wherein one or more key/value pairs of the initial state database are stored in one or more leaf nodes of a merkle tree representing the state database checkpoint.

9. The method of claim 8, wherein the state database checkpoint is a merkle tree comprising:
one or more key/value pairs in one or more leaf nodes of the merkle tree, wherein constructing the initial state database comprises extracting and storing the one or more key/value pairs from the one or more leaf nodes of the merkle tree.

10. The method of claim 8, further comprising:
comparing a root hash of the merkle tree with a consensus root hash for the state database checkpoint.

11. The method of claim 8, further comprising:
generating the merkle tree in accordance with a defined merkle tree schema.

12. The method of claim 8, further comprising:
receiving a consensus merkle tree into the node; and
comparing hash values of one or more level nodes of the consensus merkle tree and a merkle tree generated by the node to isolate one or more leaf nodes containing one or more discrepancies in one or more key/value pairs.

13. The method of claim 8, further comprising:
requesting, by the node, the state database checkpoint and the blocks of the blockchain from another node of the blockchain network.

14. The method of claim 8, further comprising:
generating, by the node, a state database checkpoint at a next checkpoint interval of a number of blocks of the blockchain and determining the node as correctly restored if the state database checkpoint matches a consensus state database checkpoint.

15. A non-transitory computer readable medium storing one or more instructions that when executed by a processor cause the processor to perform:
retrieving, into a node in a blockchain network, the node being at least one of corrupted or forked, a state database checkpoint of a state database created at a block number of a blockchain of the blockchain network, the state database checkpoint comprising a last known non-corrupted or non-forked checkpoint state;
retrieving, into the node, blocks of the blockchain from the block number, at which the state database checkpoint is created, to a current block number;
constructing an initial state database from the retrieved state database checkpoint; and
executing, at the node, transactions of the retrieved blocks on the initial state database to generate a current state database,
wherein one or more key/value pairs of the initial state database are stored in one or more leaf nodes of a merkle tree representing the state database checkpoint.

16. The non-transitory computer readable medium of claim 15, wherein the one or more instructions further cause the processor to perform:
constructing the initial state database by extracting and storing one or more key/value pairs from the one or more leaf nodes of a merkle tree representation of the state database checkpoint.

17. The non-transitory computer readable medium of claim 15, wherein the one or more instructions further cause the processor to perform:
requesting, by the node, the state database checkpoint and the blocks of the blockchain from another node of the blockchain network.

18. The non-transitory computer readable medium of claim 15, wherein the one or more instructions further cause the processor to perform:
generating, by the node, a state database checkpoint at a next checkpoint interval of a number of blocks of the blockchain and determining the node as correctly instantiated if the state database checkpoint matches a consensus state database checkpoint.

* * * * *